United States Patent
Fukui

(10) Patent No.: US 11,872,944 B2
(45) Date of Patent: Jan. 16, 2024

(54) SOUND INSULATING MATERIAL FOR VEHICLE

(71) Applicant: KOTOBUKIYA FRONTE CO., LTD., Tokyo (JP)

(72) Inventor: Kazuki Fukui, Saitama (JP)

(73) Assignee: KOTOBUKIYA FRONTE CO., LTD.

(*) Notice: Subject to any disclaimer, the term of this patent is extended or adjusted under 35 U.S.C. 154(b) by 403 days.

(21) Appl. No.: 17/267,138

(22) PCT Filed: Sep. 25, 2018

(86) PCT No.: PCT/JP2018/035405
§ 371 (c)(1),
(2) Date: Feb. 9, 2021

(87) PCT Pub. No.: WO2020/065716
PCT Pub. Date: Apr. 2, 2020

(65) Prior Publication Data
US 2021/0309163 A1  Oct. 7, 2021

(51) Int. Cl.
*B60R 13/08* (2006.01)
*B32B 3/12* (2006.01)
(Continued)

(52) U.S. Cl.
CPC ............ *B60R 13/0815* (2013.01); *B32B 3/12* (2013.01); *B32B 7/12* (2013.01); *B32B 27/06* (2013.01);
(Continued)

(58) Field of Classification Search
CPC ......... B60R 13/0815; B32B 3/12; B32B 7/12; B32B 27/06; B32B 27/32; B32B 2307/102; B32B 2605/00; G10K 11/168
See application file for complete search history.

(56) References Cited

U.S. PATENT DOCUMENTS 9,334,059 B1   5/2016  Jones et al.
11,286,042 B2 * 3/2022  Calkins ................... B64C 21/08
(Continued)

FOREIGN PATENT DOCUMENTS

JP   S5839545 A   3/1983
JP   H06305062 A  11/1994
(Continued)

OTHER PUBLICATIONS

Technical Data Sheet THPP80-FN, ThermHex, Thermoplastic Honeycomb Cores (2016). 1 pg.
(Continued)

*Primary Examiner* — Forrest M Phillips
(74) *Attorney, Agent, or Firm* — Lerner David LLP

(57) ABSTRACT

There is provided a sound-insulation material for a vehicle that can reduce the weight thereof and exhibit sufficient sound insulation performance against noise of 500 Hz to 6400 Hz generated in vehicles. The sound-insulation material for a vehicle, of the present invention, includes: a core layer having tubular cells, the tubular cells being arranged in a plurality of rows; an airflow-blocking resin film layer provided on one surface of the core layer; and a decoupling layer provided on the airflow-blocking resin film layer; and an average (P/v)/Za is 2.8 to 10 between 500 and 6400 Hz, where: P and v are respectively a sound pressure and a particle velocity on a surface of the airflow-blocking resin film layer provided on the core layer, the surface being opposite to the core layer; and Za is an acoustic impedance of the decoupling layer.

5 Claims, 5 Drawing Sheets

(51) Int. Cl.
*B32B 7/12* (2006.01)
*B32B 27/06* (2006.01)
*B32B 27/32* (2006.01)
*G10K 11/168* (2006.01)

(52) U.S. Cl.
CPC ............ *B32B 27/32* (2013.01); *G10K 11/168* (2013.01); *B32B 2307/102* (2013.01); *B32B 2605/00* (2013.01)

(56) References Cited

U.S. PATENT DOCUMENTS

| | | | |
|---|---|---|---|
| 2003/0066708 A1* | 4/2003 | Allison | ................ G10K 11/168 181/290 |
| 2005/0126848 A1 | 6/2005 | Siavoshai et al. | |
| 2005/0126852 A1 | 6/2005 | Nakajima et al. | |
| 2006/0289231 A1 | 12/2006 | Priebe et al. | |
| 2008/0001431 A1 | 1/2008 | Thompson et al. | |
| 2008/0113128 A1 | 5/2008 | Nakajima et al. | |
| 2008/0128080 A1 | 6/2008 | Nakajima et al. | |
| 2017/0253005 A1 | 9/2017 | Matsumoto | |
| 2018/0345621 A1 | 12/2018 | Matsumoto et al. | |
| 2019/0295522 A1 | 9/2019 | Hakuta | |

FOREIGN PATENT DOCUMENTS

| | | |
|---|---|---|
| JP | H07210172 A | 8/1995 |
| JP | 2002164690 A | 6/2002 |
| JP | 2005099402 A | 4/2005 |
| JP | 2005266399 A | 9/2005 |
| JP | 2008520456 A | 6/2008 |
| JP | 2008238479 A | 10/2008 |
| JP | 2008260309 A | 10/2008 |
| JP | 4231792 B2 | 3/2009 |
| JP | 4368399 B2 | 11/2009 |
| JP | 2010191029 A | 9/2010 |
| JP | 201296778 A | 5/2012 |
| JP | 2013028085 A | 2/2013 |
| JP | 2017065026 A | 4/2017 |
| WO | 2006053407 A1 | 5/2006 |
| WO | 2006053407 A9 | 5/2012 |
| WO | 2016031479 A1 | 3/2016 |
| WO | 2016181745 A1 | 11/2016 |
| WO | 2018101164 A1 | 6/2018 |

OTHER PUBLICATIONS

Technical Data Sheet THPP60-FN, ThermHex, Thermoplastic Honeycomb Cores (2016). 1 pg.
ThermHex Licensed Manufacturer of PP Honeycomb, FHP consultant, (Apr. 2018). 10 pgs.
Corporate Strategy from Honeycomb of Thermoplastics, FHP consultant, (May 2016). 10 pgs.
Thermhex PP Honeycomb Cores Offer to Producers of Sandwich Elements a New Generation of the Approved Core Material, ThermHex, Thermoplastic Honeycomb Cores (Apr. 8, 2001). 2 pgs.
International Search Report for PCT/JP2018/035405 dated Nov. 27, 2018; 3 pages.
Extended European Search Report for Application No. EP 18935228.9, dated Aug. 20, 2021, 9 pages.
Japanese Office Action for Application No. 2020-547628 dated Aug. 2, 2022, pp. 1-3.

* cited by examiner

SOUND INSULATING MATERIAL FOR VEHICLE

CROSS-REFERENCE TO RELATED APPLICATIONS

The present application is a national phase entry under 35 U.S.C. § 371 of International Application No. PCT/JP2018/035405 filed Sep. 25, 2018, published in Japanese, incorporated herein by reference.

TECHNICAL FIELD

The present invention relates to a sound-insulation material for a vehicle, and more particularly, relates to a sound-insulation material for a vehicle having sound absorption performance.

BACKGROUND ART

A typical structure of a vehicle has an engine compartment provided at the front, a trunk compartment provided at the rear, and a passenger compartment provided in the middle thereof. The passenger compartment is provided with seats such as a driver seat, a front passenger seat, and a rear seat. The passenger compartment has a dash insulator, a floor carpet, a floor spacer, a trunk trim, and a trunk floor installed so that they cover the outside of the vehicle interior. These components are formed in an uneven shape according to shapes of vehicle bodies or designs of components. Furthermore, the exterior under a vehicle body has a front fender liner, a rear fender liner, and an undercover that is formed in an uneven shape for controlling the air flow, installed thereon. For many of these components, a thermoplastic resin is used as a material, and each of the materials is heated and press-molded by a die having the shape of the component to be finished into an uneven-shaped component having a plurality of portions with different thicknesses.

As a recent trend in vehicle development, the quietness in the interior of a vehicle is emphasized. Noise transmitted to the interior of a vehicle includes noise from the windows, noise from the tires, noise from under the vehicle body, noise from engine sounds, and noise from motor sounds. It is said that particularly frequencies of 500 Hz to 4000 Hz noise causes annoyance to drivers and passengers. In addition, it is said that, in electric vehicles, even frequencies of 4000 to 8000 Hz, to which annoyance has not been felt conventionally, would cause annoyance to drivers and passengers because electric vehicles have no engine. Therefore, the interior and exterior components of vehicles are required to have a function of absorbing noise in these frequency bands. On the other hand, it is also important to reduce fuel consumption, and it is also required to reduce weight of interior and exterior components of vehicles.

In addition, JP 2005-99402 A discloses a sound absorbing structure including: a first sound absorbing portion formed of a material having an acoustic impedance substantially equal to or slightly greater than the acoustic impedance of air; and a second sound absorbing portion formed of a material having an acoustic impedance greater than that of the first sound absorbing portion. This patent document states that: if the acoustic impedance of a sound absorbing layer is significantly different from the acoustic impedance of air, most of incident sound waves are reflected at the interface between the sound absorbing layer and the air layer, that is, the surface of the sound absorbing layer; but a first sound absorbing layer configuring the interface with the air layer is made to have the above acoustic impedance, so that most of the incident sound waves reach a second sound absorbing layer without being reflected by the surface of the first sound absorbing layer; and the acoustic impedance discontinuity is made relatively small between the first sound absorbing layer and the second sound absorbing layer, so that it is possible to minimize partial reflection of the incident sound waves due to the difference in acoustic impedance at the interface between the first sound absorbing layer and the second sound absorbing layer.

REFERENCE DOCUMENT LIST

Patent Document

Patent Document 1: JP 2005-99402 A

SUMMARY OF THE INVENTION

Problem to be Solved by the Invention

As described above, sound-insulation materials for vehicles reflect the incident sound waves to block the sound by increasing the difference in acoustic impedance between air and the layer, or between the layers. Acoustic impedances greatly vary depending on layer configurations. For example, those of fiber layers are relatively small and those of rubber layers are relatively large. Therefore, a rubber layer can be used as a sound-insulation material to improve sound insulation properties, but the weight of the sound-insulation material increases, which is a problem for vehicles.

Therefore, an object of the present invention is to provide a sound-insulation material for a vehicle capable of reducing weight thereof while maintaining high rigidity thereof, and capable of exhibiting sufficient sound insulation performance, especially against noise having frequencies of 500 Hz to 6400 Hz generated in vehicles.

Means for Solving the Problem

In order to achieve the object, the present invention provides a sound-insulation material for a vehicle having a multilayer structure, the material including: a core layer having tubular cells, the tubular cells being arranged in a plurality of rows; a first airflow-blocking resin film layer provided on at least one surface of the core layer; and a decoupling layer provided on a surface of the first airflow-blocking resin film layer, the surface being opposite to the core layer; wherein: an average specific acoustic impedance ratio is $2.8 < (P/v)/Za < 10$ between 500 Hz and 6400 Hz, where: P and v are respectively a sound pressure and a particle velocity on a surface of the first airflow-blocking resin film layer provided on the core layer, the surface being opposite to the core layer; and Za is an acoustic impedance of the decoupling layer.

The tubular cell may have a polygonal tubular shape such as a substantially quadrangular tubular shape or a substantially hexagonal tubular shape, or may have a curved tubular shape such as a substantially circular tubular shape or a substantially elliptical tubular shape. It is preferable that each of the cells in the core layer have a closed surface at one end and an open end at another end, the open ends of the cells each allow an internal space of the cell to be in communication with an outside, and the open ends of the cells be arranged on both sides of the core layer such that rows of the open ends of the cells are in every other row. The open end, the one-side closed surface, and the other-side closed surface may have a polygonal shape such as a substantially quadrangular shape or a substantially hexagonal shape, or may have a curved shape such as a substantially circular shape or a substantially elliptical shape, according to the shape of the cell.

The sound-insulation material for a vehicle, of the present invention preferably has a configuration such that a thickness of the first airflow-blocking resin film layer on the core layer is 50 to 200 µm.

Alternatively, the sound-insulation material for a vehicle, of the present invention may further include a resin film layer having a plurality of apertures, the resin film layer being adhered to a surface of the core layer, the surface being opposite to the surface to which the first airflow-blocking resin film layer is adhered.

A pitch Pcy between the cells in the direction in which the cells in the core layer are adjacent to each other to form a row is preferably 10 mm or less.

The first airflow-blocking resin film layer may have a structure in which a plurality of different materials are laminated.

Effects of the Invention

The sound-insulation material for a vehicle, according to the present invention includes: a core layer having tubular cells, the tubular cells being arranged in a plurality of rows; a first airflow-blocking resin film layer provided on at least one surface of the core layer; and a decoupling layer provided on a surface of the first airflow-blocking resin film layer, the surface being opposite to the core layer; wherein: an average specific acoustic impedance ratio is 2.8<(P/v)/Za<10 between 500 Hz and 6400 Hz, where: P and v are respectively a sound pressure and a particle velocity on a surface of the first airflow-blocking resin film layer provided on the core layer, the surface being opposite to the core layer; and Za is an acoustic impedance of the decoupling layer. This configuration makes it possible: to reduce the weight of the sound-insulation material for a vehicle while maintaining high rigidity; and to reflect most of sound waves having frequencies of 500 Hz to 6400 Hz generated in vehicles after incidence on the decoupling layer, at the interface with the first airflow-blocking resin film layer to exhibit sufficient sound insulation performance against noise generated in a vehicle.

The configuration, in which the thickness of the first airflow-blocking resin film layer is 50 to 200 µm, makes it possible to reduce the weight thereof while maintaining the abovementioned sound insulation performance.

A resin film layer having a plurality of apertures is provided on the core surface opposite to the first airflow-blocking resin film layer. With this configuration, an aperture pattern preformed in the resin film layer having a plurality of apertures enables the degree of blockage of the open end to be readily adjusted and stably maintained on at least one surface of the core layer. This makes it possible to control the peak of the sound absorption coefficient of the sound-insulation material for a vehicle, and thus, to exhibit the excellent sound absorption performance as well as the abovementioned sound insulation performance.

The first airflow-blocking resin film layer has a structure in which a plurality of different materials are laminated. This configuration makes it possible to facilitate the design for making the specific acoustic impedance ratio (P/v)/Za within a predetermined range.

The core layer has a configuration such that: each of cells in the core layer has a closed surface at one end and an open end at another end; open ends of the cells each allow an internal space of the cell to be in communication with an outside; and the open ends of the cells are arranged on both sides of the core layer such that rows of the open ends of the cells are in every other row. This configuration ensures that the closed surfaces of the cells in the core layer serve as a surface for adhering the first airflow-blocking resin film layer and the core layer, and can improve adhesiveness between the first airflow-blocking resin film layer and the core layer since the closed surfaces of the cells are arranged in every other row.

MODE FOR CARRYING OUT THE INVENTION

An embodiment of a sound-insulation material for a vehicle, according to the present invention is described below with reference to the accompanying drawings. Note that the drawings are not intended to be drawn to scale unless otherwise specified.

Figure 1:
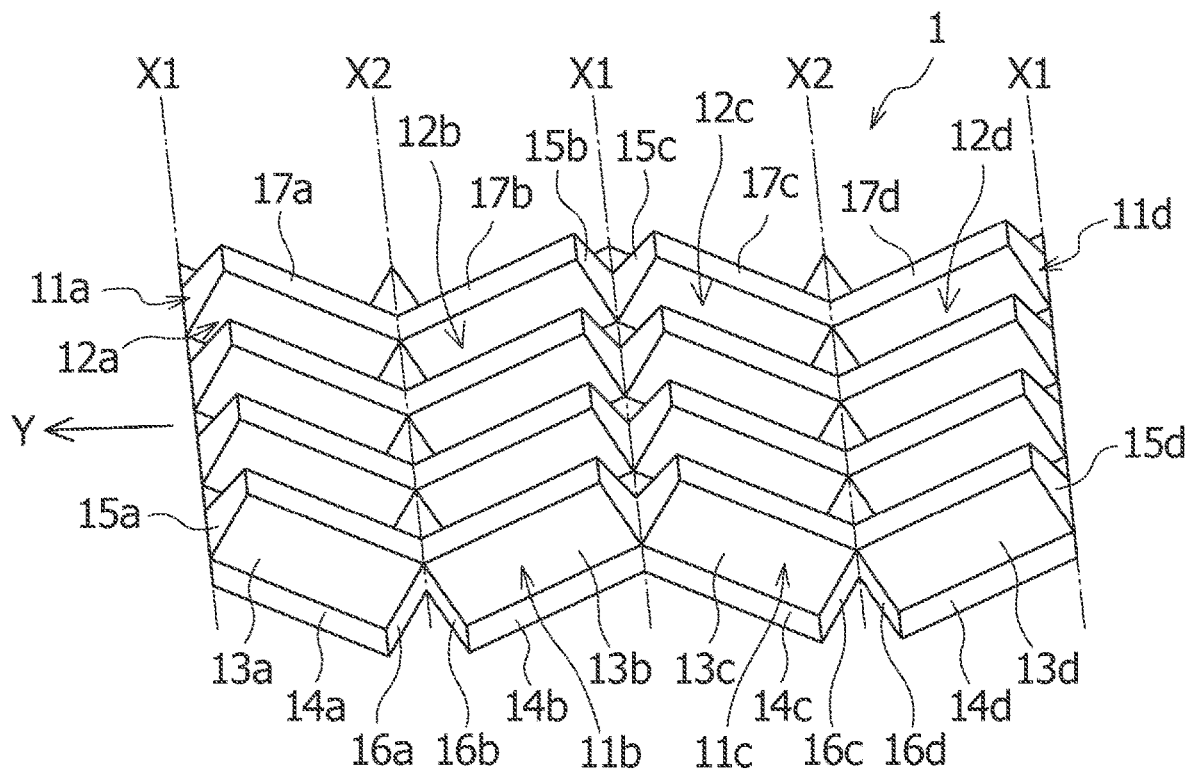
FIG. 1 is a perspective view showing a manufacturing process of a core material used for a core layer in a sound-insulation material for a vehicle, according to the present invention.

First, a core layer common to each embodiment of the sound-insulation material for a vehicle, according to the present invention is described below. FIG. 1 is a perspective view showing a manufacturing process of a core material that is to be the core layer. Note that a manufacturing method of this core material is described in detail in WO 2006/053407 A, which is incorporated herein by reference.

As shown in FIG. 1, a flat material sheet is thermoformed by a roller (not shown) having a predetermined die to be plastically deformed substantially without cutting of the sheet, so that a core material 1 in the figure is formed. The material of the core material 1 to be used can include, for example, a thermoplastic resin such as polypropylene (PP), polyethylene (PE), polyethylene terephthalate (PET), a composite material with fibers, paper, and metal, but it is not limited to these. In particular, a thermoplastic resin is preferable. In this embodiment, a case in which a thermoplastic resin is used is described below. The thickness of the material sheet is preferably in the range of 0.05 mm to 0.50 mm, for example, but it is not limited to this, and the thickness of the core material 1 after thermoforming is substantially the same.

The core material 1 has a three-dimensional structure in which ridge portions 11 and valley portions 12 are alternately arranged in a width direction X orthogonal to a manufacturing direction Y. The ridge portion 11 is configured with two side surfaces 13 and a top surface 17 between them, and the valley portion 12 is configured with two side surfaces 13 shared with the adjacent ridge portions 11 and a bottom surface 14 between them. In this embodiment, a case is described in which the shape of the ridge portion 11 is a trapezoid as shown in FIG. 1, but the present invention is not limited to this. In addition to polygons such as triangles or rectangles, shapes may be curved shapes such as sine curves or bow shapes.

The core material 1 includes the three-dimensional structure continuously in the manufacturing direction Y. That is, as shown in FIG. 1, a plurality of ridge portions 11*a*, 11*b*, 11*c*, and 11*d* are continuously formed in the manufacturing direction Y. The valley portions 12 are also formed continuously. The connection between the ridge portions 11 and the connection between the valley portions 12 are made by alternately repeating two types of connection methods.

A first connection method is such that, as shown in FIG. 1, on a first folding line X1 in the width direction, top surfaces 17*b* and 17*c* of two adjacent ridge portions 11*b* and 11*c* are connected, via trapezoidal-shaped ridge portion connecting surfaces 15*b* and 15*c*, respectively. The ridge portion connecting surface 15 is formed at a right angle to the top surface 17. On the first folding line X1 in the width direction, the bottom surfaces 14*b* and 14*c* of two adjacent valley portions are directly connected. A second connection method is such that, as shown in FIG. 1, on a second folding line X2 in the width direction, bottom surfaces 14*a* and 14*b* (or 14*c* and 14*d*) of two adjacent valley portions are connected, via trapezoidal-shaped valley portion connecting surfaces 16*a* and 16*b* (or 16*c* and 16*d*), respectively. The valley portion connecting surface 16 is formed at a right angle to the bottom surface 14. On the second folding line X2 in the width direction, top surfaces 12*a* and 12*b* (or 12*c* and 12*d*) of two adjacent ridge portions are directly connected.

Thus, the core material 1 has a plurality of three-dimensional structures (the ridge portions 11 and the valley portions 12) connected via the connection regions (the ridge portion connecting surfaces 15 and the valley portion connecting surfaces 16), and has the connection region folded to form a core layer of the sound-insulation material for a vehicle, of the present invention. Specifically, the core material 1 is mountain-folded along the first folding line X1 such that the bottom surfaces 14*b* and 14*c* of two adjacent valley portions contact back-to-back with each other, and the angle formed by the ridge portion connecting surfaces 15*b* and 15*c* of two adjacent ridge portions increases to 180 degrees. In addition, the core material 1 is valley-folded along the second folding line X2 such that top surfaces 17*a* and 17*b* (or 17*c* and 17*d*) of two adjacent ridge portions contact face to face with each other, and the angle between the valley portion connecting surfaces 16*a* and 16*b* (or 16*c* and 16*d*) of two adjacent valley portions increases to 180 degrees. A core layer 10 of the sound-insulation material for a vehicle, of the present invention obtained by folding the core material 1 in this manner is shown in FIGS. 2 and 3.

Figure 2:
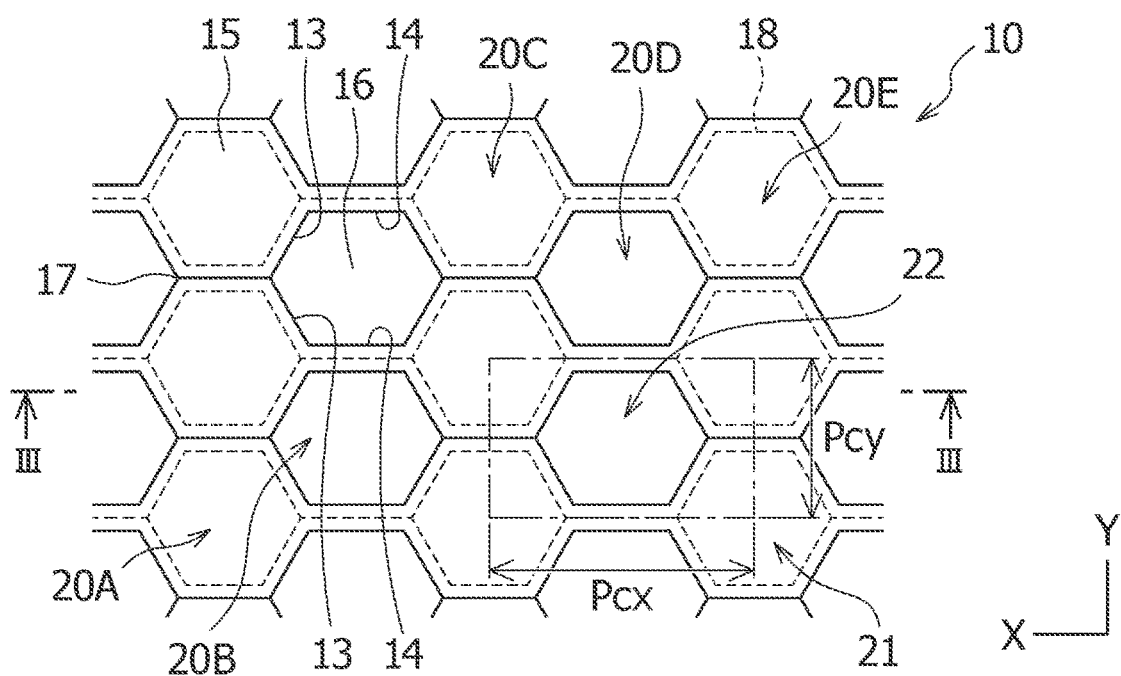
FIG. 2 is a schematic plan view showing a core layer in a sound-insulation material for a vehicle, according to the present invention.
Figure 3:
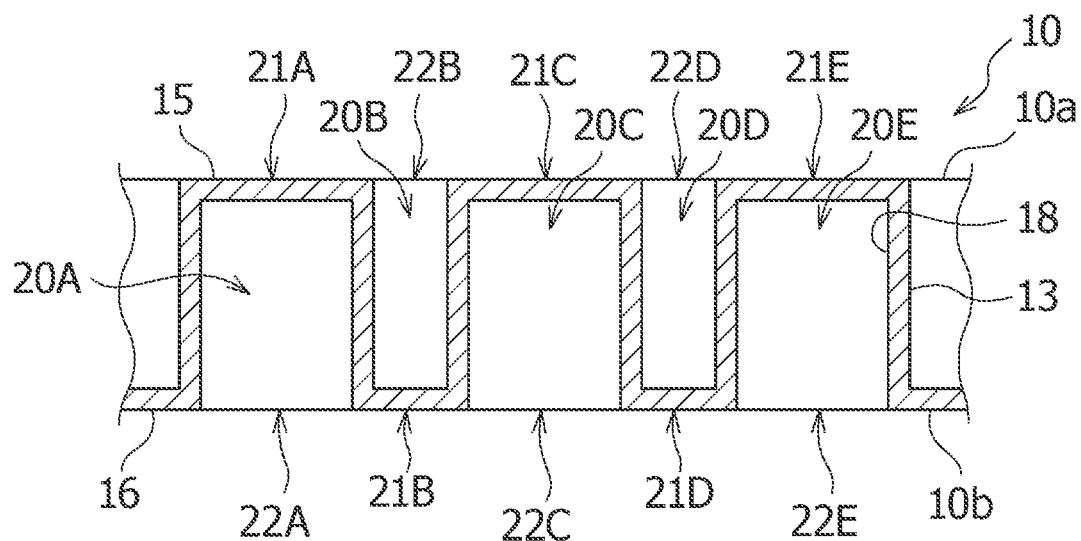
FIG. 3 is a schematic cross-sectional view showing the core layer of FIG. 2 along line III-III.

As shown in FIGS. 2 and 3, the core layer 10 includes cells 20 of substantially hexagonal tubular shape arranged in a plurality of rows, and has cells 20A, 20C and 20E formed out of two adjacent ridge portions and cells 20B and 20D formed out of two adjacent valley portions, each arranged in every other row. A broken line 18 in FIG. 3 is the surface that has been the back surface of the core material, and generally indicates the inner walls of the cell 20 having the substantially hexagonal tubular shape.

The cells 20A, 20C, and 20E formed from the ridge portions includes six cell side walls each forming the substantially hexagonal tubular shape. Each of these cell side walls is formed out of the two top surfaces 17 and the four side surfaces 13 of the cell material. Furthermore, these cells 20A, 20C, and 20E include substantially hexagonal tubular-shaped closed surfaces 21A, 21C, and 21E, respectively, to close the cell ends at the cell ends on one surface 10*a* (front surface in FIG. 2) of the core layer 10. Each of these closed surfaces 21 on one side is formed out of two trapezoidal ridge portion connecting surfaces 15 in the cell material. Furthermore, these cells 20A, 20C, and 20E include open ends 22A, 22C, and 22E that are opened in the substantially hexagonal shape at the cell ends on the other surface 10*b* which is at the opposite side of the core layer 10. The open ends 22A, 22C, and 22E allow the respective internal spaces of the cells 20A, 20C, and 20E to be in communication with the outside.

The cells 20B and 20D formed from the valley portions also includes six cell side walls each forming the substantially hexagonal tubular shape. Each of these cell side walls is formed from two bottom surfaces 14 and four side surfaces 13 of the cell material. Furthermore, these cells 20B and 20D include open ends 22B and 22D that are opened in the substantially hexagonal shape at the cell ends on the one surface 10*a* of the core layer 10. The open ends 22B and 22D allow the respective internal spaces of the cells 20B and 20D to be in communication with the outside. Furthermore, these cells 20B and 20D include substantially hexagonal tubular-shaped closed surfaces 21B and 21D that close the cell ends, respectively, at the cell ends on the other surface 10*b*, which is at the opposite side of the core layer 10. Each of these closed surfaces 21 on the other side is formed out of the two trapezoidal valley portion connecting surfaces 16 in the cell material.

In this way, the core layer 10 has the one-side closed surfaces 21A, 21C, and 21E formed out of the ridge portions of the cell material in every other row at the cell ends on one surface 10*a*, and has the other-side closed surfaces 21B and 21D formed out of valley portions of the cell material in the different cell rows from the above at the cell ends on the other surface 10*b*. However, unless otherwise stated, both the closed surface 21 on one side and the closed surface 21 on the other side perform substantially the same function.

The thickness of the entire core layer 10 varies depending on which component of the vehicle a multilayered structure is used for, so it is not limited to the following. However, it is preferably in the range of 3 mm to 50 mm, and is more preferably in the range of 5 mm to 30 mm from the viewpoint of controlling specific acoustic impedance ratios between an airflow-blocking resin film layer and a decoupling layer to be described below, the sound absorption performance of the core layer 10 itself, and the strength and weight of the core layer 10.

The basis weight (weight per unit area) of the core layer 10 varies depending on which component of the vehicle the multilayered structure is used for, so it is not limited to the following. However, it is preferably in the range of 400 g/m² to 4000 g/m², and is more preferably in the range of 500 g/m² to 3000 g/m². As the thickness of the core layer 10 is greater and the basis weight is greater, the strength of the core layer 10 generally tends to be higher.

The basis weight of the core layer 10 can be adjusted by the type of material of the core layer 10, the thickness of the entire core layer 10 or the wall thickness of the cell 20 (thickness of the material sheet) as well as the pitches Pcx and Pcy between the cells 20 in the core layer 10 (distance between the central axes of the cells). In order to set the basis weight of the core layer 10 within the above range, for example, it is preferable that the pitch Pcy between the cells 20 be in the range of 3 mm to 20 mm in the direction in which the cells 20 are adjacent to each other to form a row, which is the core manufacturing direction Y, and it is more preferable that the pitch Pcy be in the range of 4 mm to 15 mm. In particular, in order to control the specific acoustic impedance ratio between the airflow-blocking resin film layer and the decoupling layer to be described below, within a predetermined range, the pitch Pcy between the cells 20 is still more preferably 10 mm or less.

Next, individual embodiments of the sound-insulation material for a vehicle, according to the present invention, are described below using the core layer 10 described above.

First Embodiment

Figure 4:
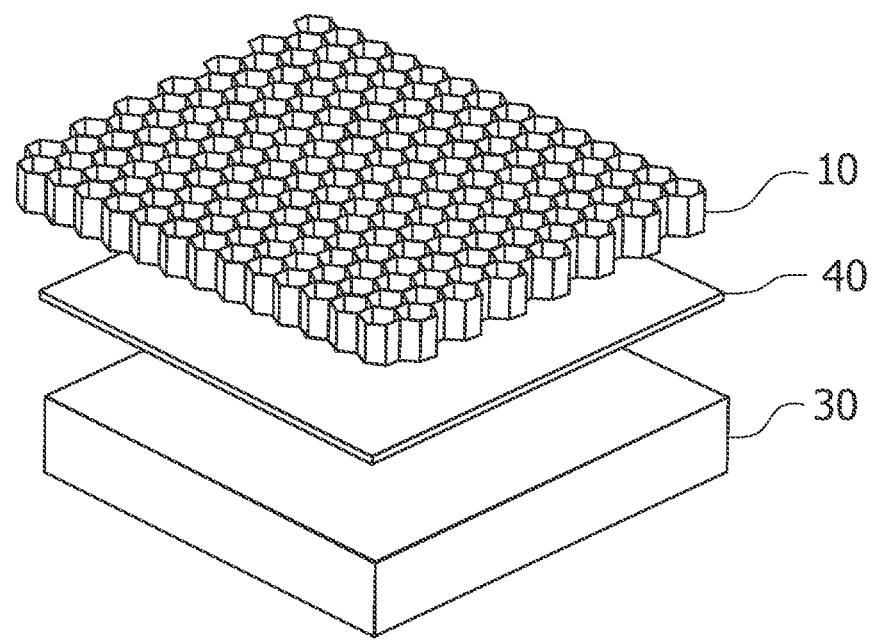
FIG. 4 is an exploded perspective view showing an embodiment of a sound-insulation material for a vehicle, according to the present invention.
Figure 5:
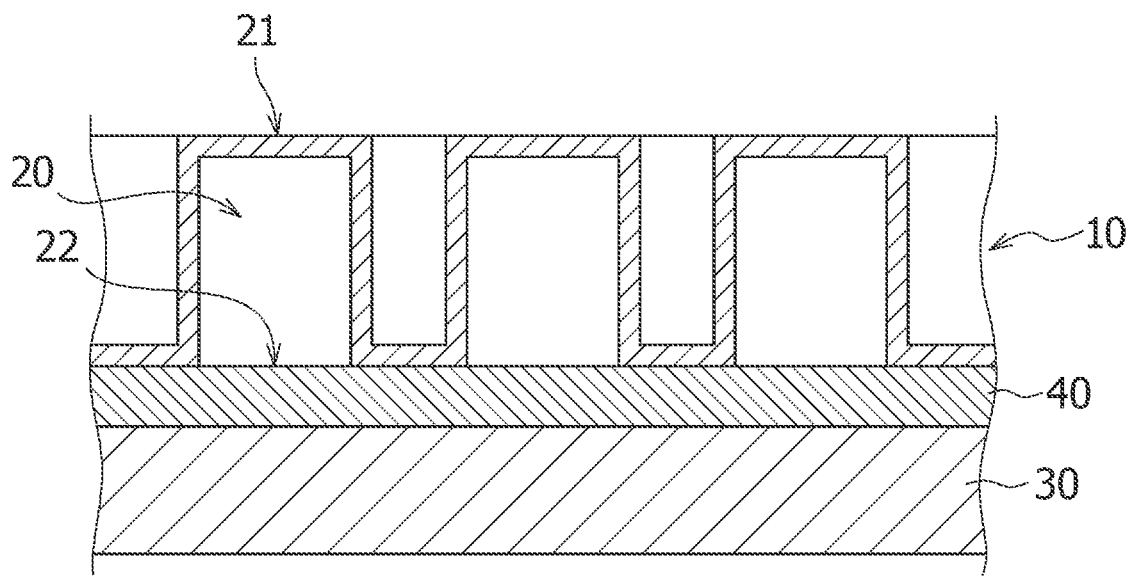
FIG. 5 is a schematic cross-sectional view of the embodiment of the sound-insulation material for a vehicle, shown in FIG. 4.

As shown in FIGS. 4 and 5, a sound-insulation material for a vehicle, of a first embodiment, includes a core layer 10 described above, an airflow-blocking resin film layer 40 provided on one surface thereof, and a decoupling layer 30 further provided on the resin film layer 40. Note that the sound-insulation material for a vehicle, of the present invention, is used so that the decoupling layer 30 side is located on the side of a noise generating source.

The material of the airflow-blocking resin film layer 40 to be used may be, for example, resin films such as polypropylene (PP), polyethylene (PE), polyethylene terephthalate (PET), and polyamide (PA), but it is not limited to these.

Although the thickness of the airflow-blocking resin film layer 40 depends on a specific acoustic impedance ratio between the airflow-blocking resin film layer and the decoupling layer to be described below, for example, the lower limit thereof is preferably 0.02 mm or more, more preferably 0.05 mm or more, and still more preferably 0.1 mm or more. In addition, the upper limit of the thickness is preferably 0.6 mm or less, more preferably 0.4 mm or less, and still more preferably 0.3 mm or less.

The airflow-blocking resin film layer 40 may be adhered to the core layer 10 by heat-welding, or may be adhered thereto via an adhesive (not shown). The adhesive to be used is not particularly limited, but for example, it may be an epoxy-based or acrylic-based adhesive. In addition, in order to heat-weld the airflow-blocking resin film layer 40 with the core layer 10 and the decoupling layer 30, for example, the airflow-blocking resin film layer 40 may have a three-layer structure including a central layer and two adhesive layers located on both side surfaces thereof. In this case, the material of the adhesive layers is a material having a melting point lower than the melting point of the material used for the central layer. For example, polyamide having a melting point of 190° C. to 220° C. is used for the central layer, and polyethylene having a melting point of 90° C. to 130° C. is used for the adhesive layer. Then, the temperature at the time of heating when the airflow-blocking resin film layer 40 is adhered to the core layer 10 and the decoupling layer 30, and the temperature for thermoforming into a predetermined shape of the sound-insulation material for a vehicle are set to about 150° C. to 160° C. This configuration and process enables the adhesive layer only to melt to firmly adhere to the core layer 10 and the decoupling layer 30, while not melting the central layer. A resin having a melting point higher than that of polyethylene for the adhesive layer is polypropylene as well as polyamide.

The decoupling layer 30 is a layer generally used as a layer for decoupling (breaking) vibration transmission in the sound-insulation material for a vehicle. The material of the decoupling layer 30 is not particularly limited if it is a material used for decoupling layers of sound-insulation materials for a vehicle. However, from the viewpoint of reducing the weight of the sound-insulation material for a vehicle, it is preferable to use polyester fibers, synthetic fibers such as nylon fibers and acrylic fibers, inorganic fibers such as glass wool and rock wool, and metal fibers such as aluminum fibers. In addition, it is also preferable to use foam of thermoplastic resin, thermosetting resin, or the like such as urethane foam, polyethylene foam, and nylon foam. In addition, the fibers and the foam may be combined. In particular, the decoupling layer 30 is preferably felt, and is preferably formed of a polyester fiber such as a low melting point polyester fiber or a material such as glass wool. In addition, the felt manufacturing method is preferably a manufacturing method such as needle punching, thermal bonding, or spunlacing.

The basis weight of the decoupling layer 30 depends on a specific acoustic impedance ratio between the airflow-blocking resin film layer and the decoupling layer to be described below, so it is not limited to the following, but for example, the lower limit thereof is preferably 10 g/m² or more, more preferably 50 g/m² or more, and still more preferably 100 g/m² or more. In addition, the upper limit of the basis weight is not limited to these, but it is preferably 1000 g/m² or less, more preferably 800 g/m² or less, and still more preferably 600 g/m² or less.

In this embodiment, an average specific acoustic impedance ratio (P/v)/Za (unit: dimensionless) is in the range of 2.8 to 10 between 500 Hz and 6400 Hz, where: P and v are respectively a sound pressure and a particle velocity on a surface of the airflow-blocking resin film layer 40 provided on the core layer 10, the surface being opposite to the core layer 10; and Za is an acoustic impedance of the decoupling layer 30. Setting the average specific acoustic impedance ratio (P/v)/Za to 2.8 or more enables sufficiently reflecting sound waves having frequencies of 500 Hz to 6400 Hz incident on the decoupling layer 30 at the interface between the decoupling layer 30 and the airflow-blocking resin film layer 40. In addition, reducing the average specific acoustic impedance ratio (P/v)/Za to 10 or less enables sufficiently exhibiting the above-mentioned sound insulation performance while maintaining the weight reduction of the sound-insulation material for a vehicle. The lower limit of the average specific acoustic impedance ratio (P/v)/Za is preferably 3 or more, and more preferably 4 or more. In addition, the upper limit of the average specific acoustic impedance ratio (P/v)/Za is preferably 9 or less, and more preferably 8 or less.

The average specific acoustic impedance ratio (P/v)/Za can be obtained by the following method. Specific acoustic impedance ratios $(P/v)/Z_0$ between air and the airflow-blocking resin film 40 provided on one surface of the core layer 10, on the surface opposite to the core layer, are measured over a frequency range of 500 Hz to 6400 Hz. Here, the acoustic impedance of air is represented by $Z_0$. P/v is also called the specific acoustic impedance. On the other hand, the specific acoustic impedance ratios $Za/Z_0$ between air and the decoupling layer 30, on the surface thereof without the core layer 10 and the airflow-blocking resin film 40, are measured over a frequency range of 500 Hz to 6400 Hz. Then, (P/v)/Za can be obtained from the measured values of $(P/v)/Z_0$ and $Za/Z_0$ at each frequency by the following expression.

$$(P/v)/Za = \frac{P/v}{Z_0} \times \frac{Z_0}{Za} \quad \text{Expression 1}$$

The average specific acoustic impedance ratio (P/v)/Za may be a simple average of the ratios measured in the frequency range of 500 Hz to 6400 Hz and at least a frequency interval of 2 Hz or less. Both $(P/v)/Z_0$ and $Za/Z_0$ described above can be measured by a method conforming to ISO 10534-2 (2-microphone transfer function method). For example, they can be measured with a commercially available impedance tube (model number 4206 manufactured by Brüel & Kjær Sound & Vibration Measurement (B & K)).

The sound pressure P and the particle velocity v differ depending on the configuration of the airflow-blocking resin film layer 40 (for example, material, thickness, and so on). The sound pressure P and the particle velocity v are also affected by the configuration of the core layer 10 (for example, the material, the arrangement of the core, the thickness of the entire core layer, the pitch of the core, the thickness of the core wall surface, and so on) provided with the airflow-blocking resin film layer 40, and the adhesive strength between the airflow-blocking resin film layer 40 and the core layer 10. The specific acoustic impedance ratio $(P/v)/Z_0$ between air and the airflow-blocking resin film layer 40 provided on the core layer 10 is not particularly limited, but for example, in the frequency range of 500 Hz to 6400 Hz, the upper limit of the average thereof is preferably 15 or less, more preferably 12 or less, and still more preferably 10 or less. In addition, the lower limit of the average specific acoustic impedance ratio $(P/v)/Z_0$ is not particularly limited, but it is preferably 3 or more, and more preferably 5 or more.

The specific acoustic impedance ratio $Za/Z_0$ between the decoupling layer 30 and air differs depending on the configuration of the decoupling layer 30 (for example, the type of material, the basis weight, and so on). The specific acoustic impedance ratio $Za/Z_0$ is not particularly limited, but for example, in the frequency range of 500 Hz to 6400 Hz, the upper limit of the average thereof is preferably 1.5 or less, more preferably 1.3 or less, and still more preferably 1.1 or less. In addition, the lower limit of the average specific acoustic impedance ratio $Za/Z_0$ is not particularly limited, but it is preferably 1.0 or more.

According to the first embodiment, an airflow-blocking resin film layer 40 is provided on at least one surface of the core layer 10 in which open ends and closed surfaces are arranged in every other row, a decoupling layer 30 is further provided on the airflow-blocking resin film layer 40, and the specific acoustic impedance ratio (P/v)/Za is made within the above-mentioned numerical range. This configuration makes it possible: to reduce the weight of the sound-insulation material for a vehicle while maintaining high rigidity; and to exhibit sufficient sound insulation performance against noise having a frequency of 500 Hz to 6400 Hz generated in the vehicle.

Second Embodiment

Figure 6:
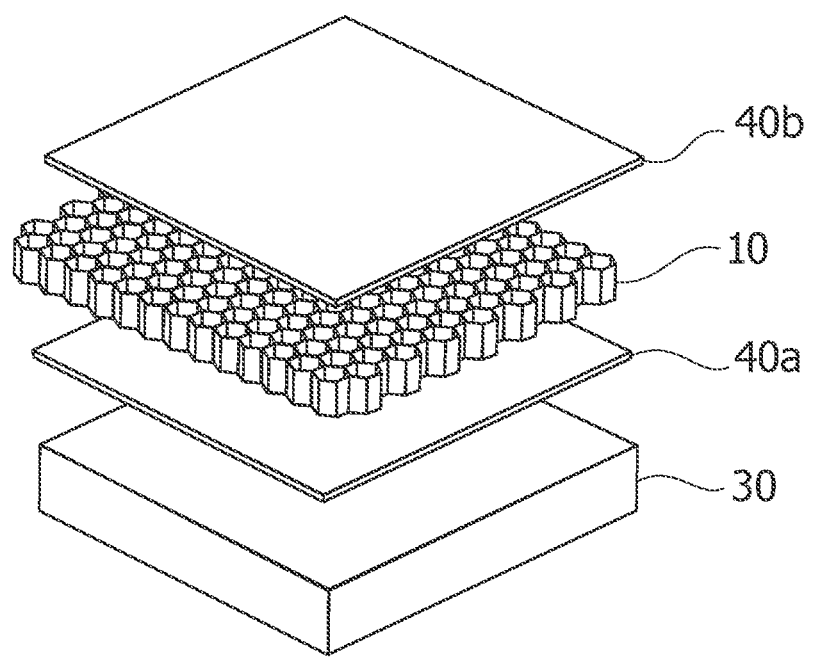
FIG. 6 is an exploded perspective view showing another embodiment of a sound-insulation material for a vehicle, according to the present invention.

As shown in FIG. 6, a sound-insulation material for a vehicle, of a second embodiment, includes: a core layer 10 described above, a first airflow-blocking resin film layer 40*a* provided on one surface thereof, a decoupling layer 30 provided on the first airflow-blocking resin film layer 40*a*, and a second airflow-blocking resin film layer 40*b* provided on the other surface of the core layer 10. Note that the same configurations as those in the first embodiment are referred to by the same reference signs, and detailed descriptions thereof are omitted here.

The first airflow-blocking resin film layer 40*a* has the same configuration (resin film material, thickness, and so on) as the one described in the first airflow-blocking resin film layer 40. In addition, the second airflow-blocking resin film layer 40*b* is also preferably the one having the same performance as the first airflow-blocking resin film layer 40*a*, although the decoupling layer is not further provided thereon. That is, the average specific acoustic impedance ratio is preferably 2.8<(P/v)/Z2a<10 between 500 Hz and 6400 Hz, where: P and v are respectively a sound pressure and a particle velocity on a surface of the second airflow-blocking resin film layer 40*b*, the surface being opposite to the core layer 10; and if the core layer 10 is filled with a sound absorbing material, Z2a is the acoustic impedance on the surface of the sound absorbing material.

Note that when the first and second airflow-blocking resin film layers 40*a* and 40*b* are provided on both sides of the core layer 10 in this way, the specific acoustic impedance ratios $(P/v)/Z_0$ between air and the first airflow-blocking resin film layer 40*a* are measured, without the decoupling layer 30, on a surface of the first resin film layer 40*a*, the surface being opposite to the core layer 10, and the specific acoustic impedance ratios $(P_2/v_2)/Z_0$ between air and the second airflow-blocking resin film layer 40*b* are measured on a surface of the second airflow-blocking resin film layer 40*b*, the surface being opposite to the core layer 10. The specific acoustic impedance ratios $Za/Z_0$ between air and the decoupling layer 30 on the surface thereof are measured without the core layer 10 and the first airflow-blocking resin film layer 40*a*, as in the first embodiment. The specific acoustic impedance ratios $Z2a/Z_0$ between air and the sound absorbing material inside the core layer 10 on the surface thereof are measured without the second airflow-blocking resin film layer 40*b*.

According to the second embodiment, the first and second airflow-blocking resin film layers 40*a* and 40*b* are provided on both surfaces of the core layer 10 in which the open ends and the closed surfaces are arranged in every other row. Also, with this configuration, since the second airflow-blocking resin film layer 40*b* has the same performance as the first airflow-blocking resin film layer 40*a*, the same effect as that of the first embodiment can be obtained. In addition, providing the second airflow-blocking resin film layer 40*b* closes the open end 22 of at least one surface of the core layer 10 to enable further improving the sound transmission loss of the sound-insulation material for a vehicle.

Third Embodiment

Figure 7:
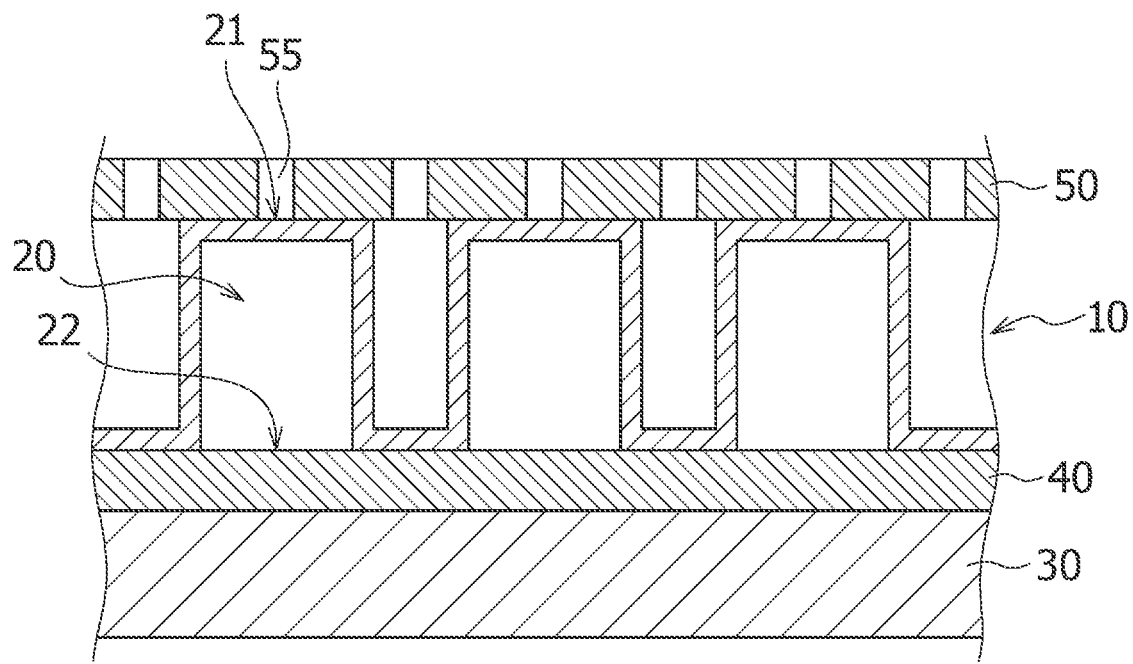
FIG. 7 is a schematic cross-sectional view showing still another embodiment of a sound-insulation material for a vehicle, according to the present invention.

As shown in FIG. 7, a sound-insulation material for a vehicle, of the third embodiment, includes: a core layer 10 described above; an airflow-blocking resin film layer 40 provided on one surface thereof; a decoupling layer 30 provided on the airflow-blocking resin film layer 40; and a resin film layer 50 having a plurality of apertures on a surface of the core layer 10, the surface being opposite to the first airflow-blocking resin film layer 40. Note that the same configurations as those in the first and second embodiments are referred to by the same reference signs, and detailed descriptions thereof are omitted here.

The resin film layer 50 having a plurality of apertures (hereinafter referred to as the apertured film layer 50) has a plurality of holes 55 passing through the layer. The holes 55 are opened in advance before being adhered to the core layer 10, for example, by a hot needle or punching (punching using a male die and a female die). In order to prevent the holes from being closed, it is preferable to have a hole shape in which burrs of the holes are minimized.

The holes 55 do not have any particular limitation on their aperture pattern, but they are preferably arranged in a staggered arrangement or a lattice arrangement. The aperture rate of the apertured film layer 50 is not particularly limited, but it is preferably in the range of 0.2% to 5%. The diameter of the holes 55 is preferably in the range of 0.25 mm to 2.5 mm, and more preferably in the range of 0.3 mm to 2.0 mm.

Note that the pitches of the holes 55 of the apertured film layer 50 do not necessarily have to be the same as the pitches Pcx and Pcy of the cells 20 in the core layer 10 shown in FIG. 2, and the holes 55 and the cells 20 do not necessarily have to be aligned when the apertured film layer 50 is adhered to the core layer 10. This is because the positions of the holes 55 of the apertured film layer 50 and the open ends 22 of the cells 20 in the core layer 10 randomly overlap with each other to enable appropriate communication between the inside and outside. It is preferable that the pitch of the holes 55 of the apertured film layer 50 be smaller than the pitch of the cells 20 in the core layer 10 at least in either an X direction or a Y direction.

According to the third embodiment, also with the apertured film layer 50 provided on a surface of the core layer 10, the surface being opposite to the airflow-blocking resin film layer 40, the same effect as that of the first embodiment can be obtained. In addition, the aperture pattern preformed in the apertured film layer 50 enables the degree of blockage of the open end 22 to be readily adjusted and stably maintained on at least one surface of the core layer 10. This makes it possible to control the ratio of sound insulation and sound absorption of the sound-insulation material for a vehicle. Therefore, with respect to the first airflow-blocking resin film layer 40a and the decoupling layer 30, it is possible to more readily control the value of the specific acoustic impedance ratio (P/v)/Za described above and the sound insulation performance of the sound-insulation material for a vehicle.

Fourth Embodiment

Figure 8:
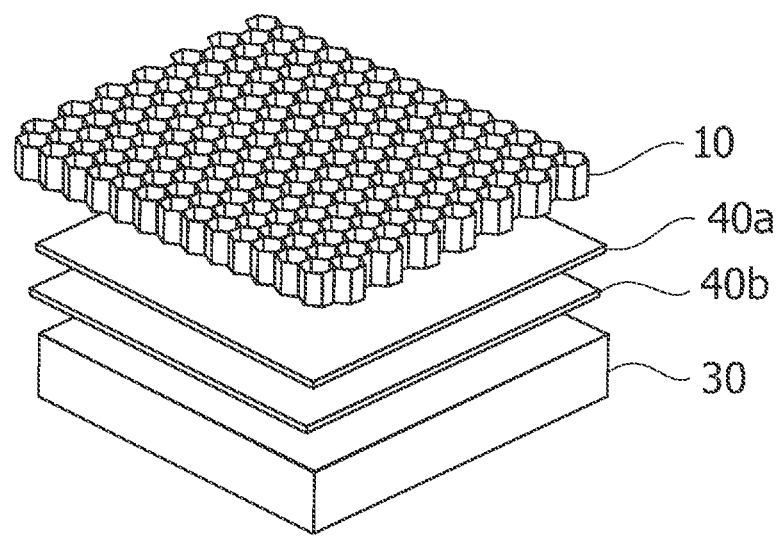
FIG. 8 is an exploded perspective view showing still another embodiment of a sound-insulation material for a vehicle, according to the present invention.

As shown in FIG. 8, a sound-insulation material for a vehicle, of a fourth embodiment, includes: a core layer 10 described above; a plurality of airflow-blocking resin film layers 40a and 40b provided on one surface thereof; and a decoupling layer 30 provided on the airflow-blocking resin film layer 40b. Note that the same configurations as those in the first and second embodiments are referred to by the same reference signs, and detailed descriptions thereof are omitted here.

The plurality of airflow-blocking resin film layers 40a and 40b to be used may have the same configuration (the material, thickness, and the like of the resin film) or may have different configurations from each other. When the plurality of airflow-blocking resin film layers 40a and 40b are provided between the core layer 10 and the decoupling layer 30 in this way, the sound pressure P and the particle velocity v are measured on the outermost surface of the airflow-blocking resin film layer 40b, out of the plurality of airflow-blocking resin film layers 40a and 40b provided on the core layer 10.

According to the fourth embodiment, also with the plurality of airflow-blocking resin film layers 40a and 40b provided between the core layer 10 and the decoupling layer 30, the same effect as that of the first embodiment can be obtained. In addition, the plurality of airflow-blocking resin film layers 40a and 40b may have different configurations from each other, so that it is possible to increase the degree of freedom in design when adjusting the value of the specific acoustic impedance ratio (P/v)/Za described above, and to more readily control the sound insulation performance of the sound-insulation material for a vehicle.

Examples

Examples and a comparative example of the present invention are described below.

As Example 1, a sound-insulation material for a vehicle having a multilayer structure shown in FIGS. 4 and 5 was produced. First, an airflow-blocking resin film (material: polyethylene/polyamide/polyethylene 3-layer film) with a thickness of 50 μm was adhered to one surface of the core layer having the structure of FIGS. 1 to 3 (material: polypropylene resin, pitch Pcy between cells: 4 mm, thickness of core layer: 6 mm), and the specific acoustic impedance ratios $(P/v)/Z_0$ between air and this airflow-blocking resin film on the surface thereof were measured over a frequency range of 500 Hz to 6400 Hz with an impedance tube (model number 4206, φ29 manufactured by B & K). Next, felt (material: miscellaneous fibers, manufacturing method: needle punching, basis weight: 300 g/m$^2$) was adhered to the airflow-blocking resin film as a decoupling layer. Here, the specific acoustic impedance ratios $Za/Z_0$ between air and the felt on the surface thereof were measured over a frequency range of 500 Hz to 6400 Hz with the impedance tube. The specific acoustic impedance ratios (P/v)/Za were calculated from these measured values. The average specific acoustic impedance ratio (P/v)/Za of Example 1 was 7.7 in the frequency range of 500 Hz to 6400 Hz. In addition, the surface density of the sound-insulation material for a vehicle, of Example 1, was 666 g/m$^2$.

In the same manner as in Example 1, as shown in Table 1 below, the sound-insulation materials for a vehicle, of Examples 2 to 12, were produced in which the materials, basis weights, thicknesses, and the like of the airflow-blocking resin film and the decoupling layer were changed. Then, the specific acoustic impedance ratios $(P/v)/Z_0$ and $Za/Z_0$, and the surface density thereof were measured. In addition, as a comparative example, the specific acoustic impedance ratio and the surface density were also measured for a rubber sheet with the same size (material: ethylene propylene diene rubber (EPDM)). The results including Example 1 are shown in Table 1 and FIG. 9.

TABLE 1

| | Core layer | | Airflow-blocking resin film layer (Thickness) | Surface density [g/m²] | Specific acoustic impedance Ratio (P/v)/Za [—] |
|---|---|---|---|---|---|
| | Pitch [mm] | Thickness [mm] | | | |
| Example 1 | 4 | 6 | 3-layer film (50 μm) | 666 | 7.7 |
| Example 2 | 4 | 6 | PP film (50 μm) | 666 | 5.3 |
| Example 3 | 4 | 6 | PP film (150 μm) | 788 | 7.4 |
| Example 4 | 4 | 6 | Cold resistant PP film (200 μm) | 894 | 9.1 |
| Example 5 | 4 | 6 | Cold resistant PP film (300 μm) | 1075 | 7.7 |
| Example 6 | 4 | 6 | PP film (430 μm) | 1333 | 9.6 |
| Example 7 | 8 | 10 | 3-layer film (50 μm) | 773 | 2.8 |
| Example 8 | 8 | 10 | PP film (50 μm) | 757 | 5.1 |
| Example 9 | 8 | 10 | PP film (150 μm) | 939 | 5.1 |
| Example 10 | 8 | 10 | Cold resistant PP film (200 μm) | 1106 | 6.6 |
| Example 11 | 8 | 10 | Cold resistant PP film (300 μm) | 1303 | 5.1 |
| Example 12 | 8 | 10 | PP film (430 μm) | 1484 | 6.6 |
| Comparative example | — | — | — | 1000 | 2.7 |

Figure 9:
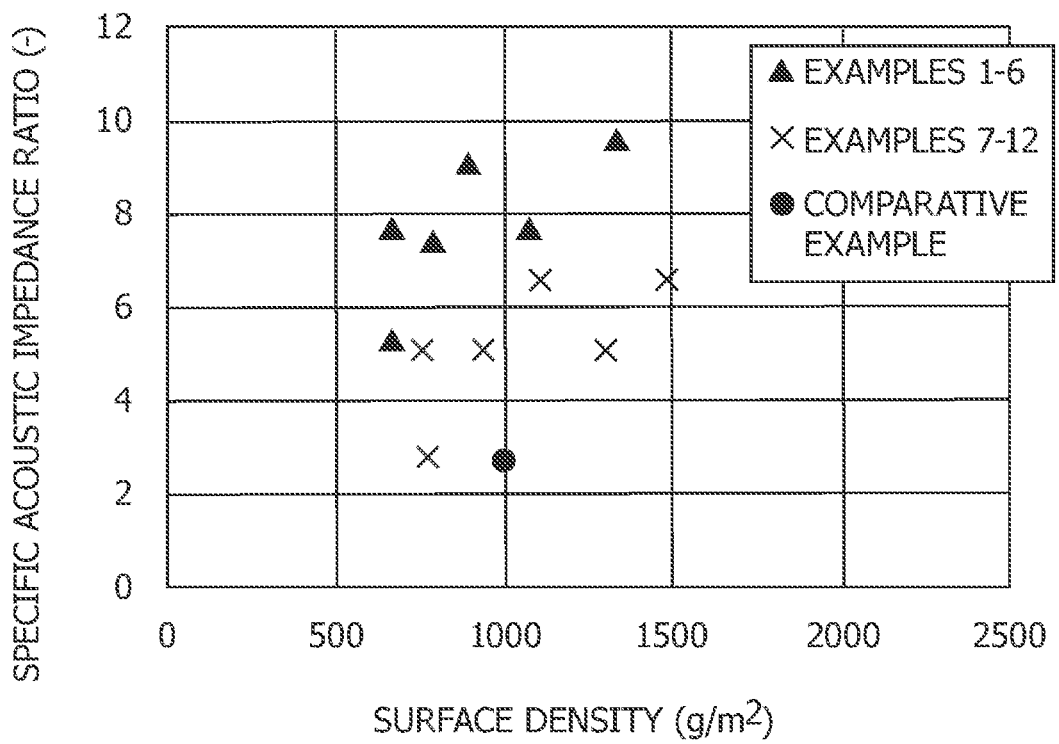
FIG. 9 is a graph showing a relationship between surface densities and specific acoustic impedance ratios in Examples and Comparative Example of sound-insulation materials for a vehicle, according to the present invention.
Figure 10:
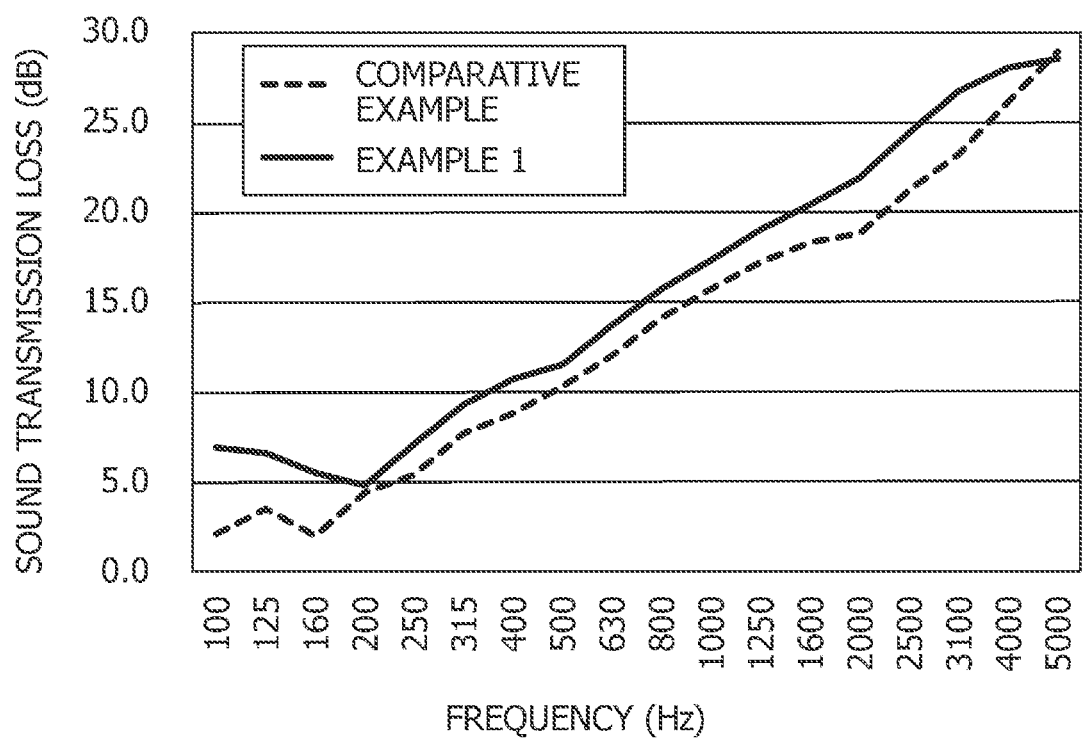
FIG. 10 is a graph showing a relationship between frequencies and sound transmission losses in Examples and Comparative Example of sound-insulation materials for a vehicle, according to the present invention.

As shown in Table 1 and FIG. 9, it was confirmed that, as compared with the comparative example of the rubber sheet having a surface density of 1000 g/m², all the examples successfully obtained great specific acoustic impedance ratios with respect to the surface densities, and thus exhibited high sound insulation properties while reducing the weight of the sound-insulation materials for a vehicle. A graph showing this more clearly is in FIG. 10. FIG. 10 shows the results of measuring the sound transmission loss (dB) between frequencies of 100 Hz and 5000 Hz with respect to Example 1 and Comparative Example. Here, the sound transmission loss was measured by measuring sound intensity in combination with a reverberation room and an anechoic room. The relationship between the sound transmission loss and each measured value is shown in the following expression. The size of each measurement sample was 500 mm×600 mm.

$$TL = SPL_0 - PWL_i + 10 \log_{10} S - 6$$

where:
TL is the sound transmission loss (dB),
$SPL_0$ is the average sound pressure level in the reverberation room (dB),
$PWL_i$ is the power level of transmitted sound (dB), and
S is the sample area (m²).

As shown in FIG. 10, Example 1 has a mass of about ⅔ of that of Comparative Example and has sound transmission loss about 3 dB higher than that of Comparative Example over frequencies of 500 Hz to 5000 Hz, and thus this can maintain high sound insulation properties while significantly reducing the weight of the sound-insulation material for a vehicle.

INDUSTRIAL APPLICABILITY

According to the sound-insulation material for a vehicle, of the present invention, sufficient sound insulation performance can be obtained with the airflow-blocking resin film and the decoupling layer while the weight is reduced and the high rigidity is maintained. More specifically, the sound-insulation material for a vehicle, of the present invention, is useful for a component that blocks noise between the noise generating source and the inside of the vehicle compartment, such as a floor carpet, a floor spacer, a trunk trim, a trunk floor, a dash insulator, and an undercover.

REFERENCE SIGNS LIST

1 Core material
10 Core layer
11 Ridge portion
12 Valley portion
13 Side surface portion
14 Bottom surface portion
15 Ridge portion connecting surface
16 Valley portion connecting surface
17 Top surface
18 Back surface of core material
19 Through hole
20 Cell
21 Closed surface
22 Open end
30 Decoupling layer
40 Airflow-blocking resin film layer
50 Resin film layer having a plurality of apertures
55 Hole

The invention claimed is:

1. A sound-insulation material for a vehicle, having a multilayer structure, the material comprising:
    a core layer having tubular cells, the tubular cells being arranged in a plurality of rows wherein each of the cells in the core layer has a closed surface at one end and an open end at another end, and the open ends of the cells are arranged on both sides of the core layer such that rows of the open ends of the cells are in every other row;
    a first airflow-blocking resin film layer provided on at least one surface of the core layer, the first airflow-blocking resin film layer is non-apertured; and
    a decoupling layer provided on a surface of the first airflow-blocking resin film layer, the surface being opposite to the core layer,
    wherein the closed surfaces of the cell arranged in every other row serve as a surface for adhering the first airflow-blocking resin film layer and the core layer, and;
    wherein an average specific acoustic impedance ratio is 2.8<(P/v)/Za<10 between 500 Hz and 6400 Hz, where P and v are respectively a sound pressure and a particle velocity on a surface of the first airflow-blocking resin film layer provided on the core layer, the surface being opposite to the core layer, and Za is an acoustic impedance of the decoupling layer.

2. The sound-insulation material for a vehicle, according to claim 1, wherein a thickness of the first airflow-blocking resin film layer is 50 to 200 μm.

3. The sound-insulation material for a vehicle, according to claim 1, further comprising a resin film layer having a plurality of apertures, the resin film layer being adhered to a surface of the core layer, the surface being opposite to the surface to which the first airflow-blocking resin film layer is adhered.

4. The sound-insulation material for a vehicle, according to claim 1, wherein a pitch Pcy between the cells in a direction in which the cells in the core layer are adjacent to each other to form a row is 10 mm or less.

5. The sound-insulation material for a vehicle, according to claim 1, wherein the first airflow-blocking resin film layer has a structure in which a plurality of different materials are laminated.

\* \* \* \* \*